(12) United States Patent
Wen

(10) Patent No.: US 12,335,154 B2
(45) Date of Patent: Jun. 17, 2025

(54) DYNAMIC LEAF DETERMINATION FOR TREE CREATIONS FOR HIGH-SPEED NETWORK POLICY SEARCH DURING DATA PACKET SCANNING

(71) Applicant: Fortinet, Inc., Sunnyvale, CA (US)

(72) Inventor: Shushan Wen, Pleasant Hill, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 18/129,038

(22) Filed: Mar. 30, 2023

(65) Prior Publication Data

US 2023/0239213 A1 Jul. 27, 2023

Related U.S. Application Data

(63) Continuation-in-part of application No. 17/566,855, filed on Dec. 31, 2021.

(51) Int. Cl.
*H04L 47/20* (2022.01)
*G06F 16/22* (2019.01)
(Continued)

(52) U.S. Cl.
CPC .......... *H04L 47/20* (2013.01); *G06F 16/2246* (2019.01); *H04L 47/2441* (2013.01); *H04L 63/0263* (2013.01); *H04L 63/20* (2013.01)

(58) Field of Classification Search
CPC ....... H04L 41/0893–0894; H04L 45/38; H04L 47/2441; H04L 63/0227–0263;
(Continued)

(56) References Cited

U.S. PATENT DOCUMENTS 5,951,651 A 9/1999 Lakshman et al.
6,587,466 B1 * 7/2003 Bhattacharya ...... H04L 41/0894
370/395.43

(Continued)

OTHER PUBLICATIONS

Chen, Shuhui, et al. "CMT: an efficient algorithm for scalable packet classification." The Computer Journal 64.6 (2021 ): 941-959.
(Continued)

*Primary Examiner* — Brendan Y Higa
(74) *Attorney, Agent, or Firm* — Law Office of Dorian Cartwright; Dorian Cartwright

(57) ABSTRACT

During high-speed network policy searching for data packets, an upper limit and a lower limit for a policy count are predefined for a ratio of the policy count to the sum of the policy count and the range count. A policy tree builder generates a policy tree image from a set of recursive operations on the raw policy set including an on-the-fly determination of whether a specific node is a leaf based on a leaf policy count limit, wherein for a selected dimension, the specific node is converted to the leaf if the policy count does not exceed the leaf policy count limit and the range count for the selected dimension does not exceed a product of the leaf policy count limit and a range count limit coefficient, and otherwise the specific node is converted to two or more child nodes. A network processor configures at least one set of registers, at least one set of tables, and at least one sequence of instructions according to the policy tree image.

9 Claims, 9 Drawing Sheets

(51) Int. Cl.
*H04L 9/40* (2022.01)
*H04L 47/2441* (2022.01)

(58) Field of Classification Search
CPC ... H04L 47/20–2491; H04L 47/80–808; G06F 16/2246; G06F 18/2323
See application file for complete search history.

(56) References Cited

U.S. PATENT DOCUMENTS

| | | | |
|---|---|---|---|
| 6,880,158 B1 | 4/2005 | Basso et al. | |
| 6,970,462 B1 | 11/2005 | McRae | |
| 7,236,493 B1 | 6/2007 | McRae | |
| 7,249,149 B1 | 7/2007 | Eatherton et al. | |
| 9,270,586 B2 | 2/2016 | Assarpour | |
| 10,103,976 B2 | 10/2018 | Nainar et al. | |
| 10,460,250 B2* | 10/2019 | Goyal | G06N 5/045 |
| 10,944,724 B2* | 3/2021 | Guo | H04L 69/22 |
| 12,041,032 B2* | 7/2024 | Wen | H04L 63/0227 |
| 2002/0023089 A1* | 2/2002 | Woo | H04L 63/0263 |
| 2005/0132034 A1 | 6/2005 | Iglesia et al. | |
| 2010/0175124 A1* | 7/2010 | Miranda | H04L 63/0263 726/13 |
| 2013/0089099 A1 | 4/2013 | Pollock et al. | |
| 2013/0166491 A1* | 6/2013 | Zhang | G06N 5/02 706/47 |
| 2014/0086240 A1 | 3/2014 | Assarpour | |
| 2015/0117450 A1 | 4/2015 | Thibaut | |
| 2015/0195194 A1* | 7/2015 | Goyal | H04L 45/484 370/256 |
| 2016/0191466 A1 | 6/2016 | Pernicha | |
| 2016/0335298 A1 | 11/2016 | Haggerty et al. | |
| 2018/0152385 A1* | 5/2018 | Xu | H04L 47/32 |
| 2018/0287859 A1 | 10/2018 | Desigowda et al. | |
| 2019/0306118 A1* | 10/2019 | Guo | H04L 63/20 |
| 2020/0403975 A1 | 12/2020 | Kashima et al. | |
| 2022/0014970 A1 | 1/2022 | Cao | |
| 2024/0114000 A1* | 4/2024 | Wen | H04L 63/0227 |
| 2024/0323165 A1* | 9/2024 | Wen | H04L 63/20 |

OTHER PUBLICATIONS

Jamil, Hasibul, and Ning Weng. "Multibit tries packet classification with deep reinforcement learning." 2020 IEEE 21st International Conference on High Performance Switching and Routing (HPSR). IEEE, 2020.

Li, Wenjun, et al. "Cutsplit: A decision-tree combining cutting and splitting for scalable packet classification." IEEE in Focom 2018-IEEE Conference on Computer Communications. IEEE, 2018.

Liu, Zhi, et al. "BitCuts: A fast packet classification algorithm using bit-level cutting." Computer Communications, 109 (2017), pp. 38-52.

"Machine Code". FOLDOC: Free Online Dictionary of Computing, https://foldoc.org/machine+code, Jun. 2009.

Vamanan, Balajee, Gwendolyn Voskuilen, and T. N. Vijaykumar. "EffiCuts: Optimizing packet classification for memory and throughput." ACM SIGCOMM Computer Communication Review 40.4 (2010): 207-218.

* cited by examiner

540

```
/* System Settings */
  MIN_LEAF_POLCNT_LMT  // minimal leaf policy count limit
  MAX_LEAF_POLCNT_LMT  // maximal leaf policy count limit
  COEF_RNGCNT_LMT      // coefficient of range count limit /* Set node to leaf based on polcnt and rngcnt of node */
set_leaf(node, dim)
{
  node.is_leaf = false;
  lcl = get_leaf_polcnt_limit(node.polcnt, node.rngcnt[dim]);
  if (node.polcnt <= lcl &&
      node.rngcnt[dim] <= lcl*COEF_RNGCNT_LMT) {
    node.is_leaf = true;
  }
  return node.is_leaf;
}

/* Get dynamic polcnt limit */
get_leaf_polcnt_limit(polcnt, rngcnt)
{
  if (polcnt == 0)
    r = 0.0;
  else
    r = 1.0*polcnt/(polcnt+rngcnt);
  lcl = MIN_LEAF_POLCNT_LMT +
    r*(MAX_LEAF_POLCNT_LMT-MIN_LEAF_POLCNT_LMT);
  return lcl;
}
```

```
/* System Settings */
  ACTIVE_DIM_LST // active dimension list

/* Build tree from node recursively */
build_tree_from_node(node)
{
  dim = select_dim(node);
  if (set_leaf(node, dim))
    return;
  // else: node is not a leaf
  cut_on_node(node); // node.child_cnt will be set
  for (i=0; i<node.child_cnt; ++i) {
    build_tree_from_node(node.child[i]); //TODO: need update the final one
  }
}

/* Select a dimension on node */
select_dim(node)
{
  best_m = -1; // unused yet
  best_dim = 0;
  for (dim in ACTIVE_DIM_LST) {
    m = get_dim_metric(node, dim);
    if (best_m < m) {
      best_m = m;
      best_dim = dim;
    }
  }
  return best_dim;
}

/* Get dimension metric that represents features on given dimension */
get_dim_metric(node, dim)
{ // example
  return node.rngcnt[dim];
}
```

*FIG. 5E*

DYNAMIC LEAF DETERMINATION FOR TREE CREATIONS FOR HIGH-SPEED NETWORK POLICY SEARCH DURING DATA PACKET SCANNING

CROSS-REFERENCE TO RELATED APPLICATIONS

The application claims priority under 35 USC 120 as a continuation-in-part to U.S. patent application Ser. No. 17/566,855, by Shushan Wen and entitled, GENERIC TREE POLICY SEARCH OPTIMIZATION FOR HIGH-SPEED NETWORK PROCESSOR CONFIGURATION, the contents of which are hereby incorporated by reference in its entirety.

FIELD OF THE INVENTION

The invention relates generally to computer processors and computer networking, and more specifically, for dynamic leaf generation determination for generic tree policy search optimization in high-speed network processor configuration for examining data packets.

BACKGROUND

In an enterprise-grade gateway that is designed for working in high-speed networks, packet processing and network security is usually guarded by a set of policies. By giving certain policy configuration, a user can instruct the gateway to forward or block specific traffic, which as a requirement for the user's environment, tends to change from user to user, and from time to time. When the size of the policy set grows, the policy matching becomes a technical challenge for the software and hardware design of the gateway in the network system.

When a policy search tree (PST) is employed by the policy search engine of the gateway, deciding when to stop searching is critical for the performance. This is controlled by the tree builder (TBR) in the configuration tool that translates the policy set to the corresponding tree(s). Very often, without an appropriate leaf determination functionality, a tree can extend very deep in certain branches due to uneven distribution of policies on one or more dimensions (e.g., source IP ranges, destination IP ranges, protocol ranges, source port ranges, destination port ranges, etc.). A static method may put a larger number of policies under a leaf node, to shorten the tree depth, which, on the other hand, can lead to a long linear search on candidate policies once a leaf is reached, even though the leaf is sitting on a short branch. Therefore, how to strike a balance in order to achieve good performance becomes a technical issue whenever the policy set is updated.

Therefore, what is needed is a robust technique for dynamic leaf generation determination for generic tree policy search optimization in high-speed network processor configuration for examining data packets.

SUMMARY

These shortcomings are addressed by the present disclosure of methods, computer program products, and systems for dynamic leaf generation determination for generic tree policy search optimization in high-speed network processor configuration for examining data packets.

In one embodiment, a raw policy set for the network processor and a dimension bitmap corresponding to the raw policy set is stored. An upper limit and a lower limit for a policy count are predefined for a ratio of the policy count to the sum of the policy count and the range count. A policy tree builder can generate a policy tree image from a set of recursive operations on the raw policy set including an on-the-fly determination of whether a specific node is a leaf based on a leaf policy count limit, wherein for a selected dimension, the specific node is converted to the leaf if the policy count does not exceed the leaf policy count limit and the range count for the selected dimension does not exceed a product of the leaf policy count limit and a range count limit coefficient, and otherwise the specific node is converted to two or more child nodes.

In another embodiment, a network processor configures at least one set of registers, at least one set of tables, and at least one sequence of instructions according to the policy tree image. A queue receives data packets of a data packet session. The network processor applies the optimized policy tree image to the data packet session from the data communication network by the network processor.

Advantageously, computer performance is improved with more efficient policy tree building for network packet processing and, in turn, computer network performance is improved.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 5D is sample pseudo code for setting a leaf node based on a dynamic leaf count limit, according to an embodiment.

FIG. 5E is sample pseudo code for building a tree recursively from a node using select_dim( )and set_leaf( ) according to an embodiment.

DETAILED DESCRIPTION

The description below provides methods, computer program products, and systems for dynamic leaf generation determination for generic tree policy search optimization in high-speed network processor configuration for examining data packets.

One of ordinary skill in the art will recognize many additional variations made possible by the succinct description of techniques below.

I. Systems for Dynamic Leaf Generation in Policy Tree Search (FIG. 1)

Figure 1:
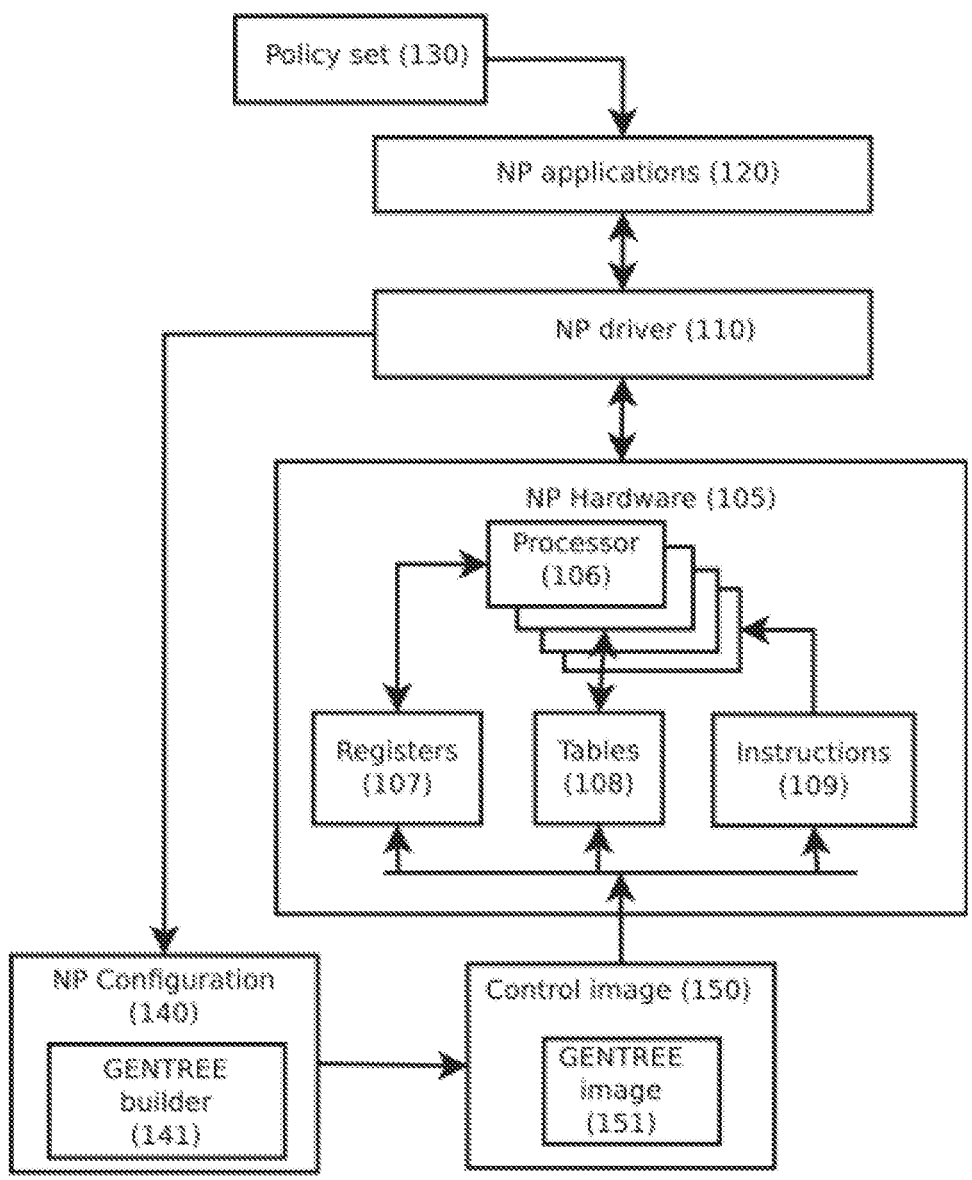
FIG. 1 is a high-level block diagram illustrating a network processor for dynamic leaf generation determination for generic tree policy search optimization in high-speed network processor configuration for examining data packets, according to an embodiment.

FIG. 1 is a high-level illustration of a network processor 100 for dynamic leaf generation determination for generic tree policy search optimization in high-speed network processor configuration for examining data packets, according to an embodiment. The network processor 100 can be implemented in many network devices (e.g., an access point, a router, a gateway, a firewall, a switch, a controller, a server, or other packet processing device) either alone or in concert with other processors. The network processor 100 can be attached to a PCB (printed circuit board) connected to other network hardware components, and can have a cooling fan or vent attached. Many other configurations are possible.

When a policy set 130 is given, the corresponding module in network processor applications 120 converts the policy set to a driver compatible format and sends it to the network processor driver 110. The network processor diver calls the network processor configuration module 140, which includes the GENTREE builder 141. When the network processor configuration module generates a control image 150, the GENTREE builder generates the GENTREE images 151 embedded in the control image. Then the control image can be loaded to the network processor hardware 105, specifically configuring registers 107, tables 108, and/or a sequence of instructions 109 that will be fetched and executed by one or more processor modules 106. Thereafter, the network processor hardware 105 can process packets.

The network processor configuration module 140 accesses a raw policy set for the network processor and a dimension bitmap corresponding to the raw policy set. A dimension can refer to a range within a policy and include, for example, a source IP, a destination IP, a protocol, a source port and a destination port. An upper limit and a lower limit for a policy count are predefined for a ratio of the policy count to the sum of the policy count and the range count. A dynamic leaf generation technique described herein, in an embodiment, can depend on a range between the upper limit and the lower limit for a policy count, as shown by graph in FIG. 5C and in pseudocode in FIG. 5D. The GENTREE builder 141, in one embodiment, generates a policy tree image from a set of recursive operations on the raw policy set including an on-the-fly determination of whether a specific node is a leaf based on a leaf policy count limit. For a selected dimension, the specific node is converted to the leaf if the policy count does not exceed the leaf policy count limit and the range count for the selected dimension does not exceed a product of the leaf policy count limit and a range count limit coefficient. Otherwise, the specific node is converted to one or more child nodes.

Network processor hardware configures at least one set of registers, at least one set of tables, and at least one sequence of instructions according to the policy tree image. A queue to receive data packets of a data packet session. The network processor applies the optimized policy tree image to the data packet session from the data communication network by the network processor.

II. Methods for Dynamic Leaf Generation in Policy Tree Search (FIG. 2-5F)

Figure 2:
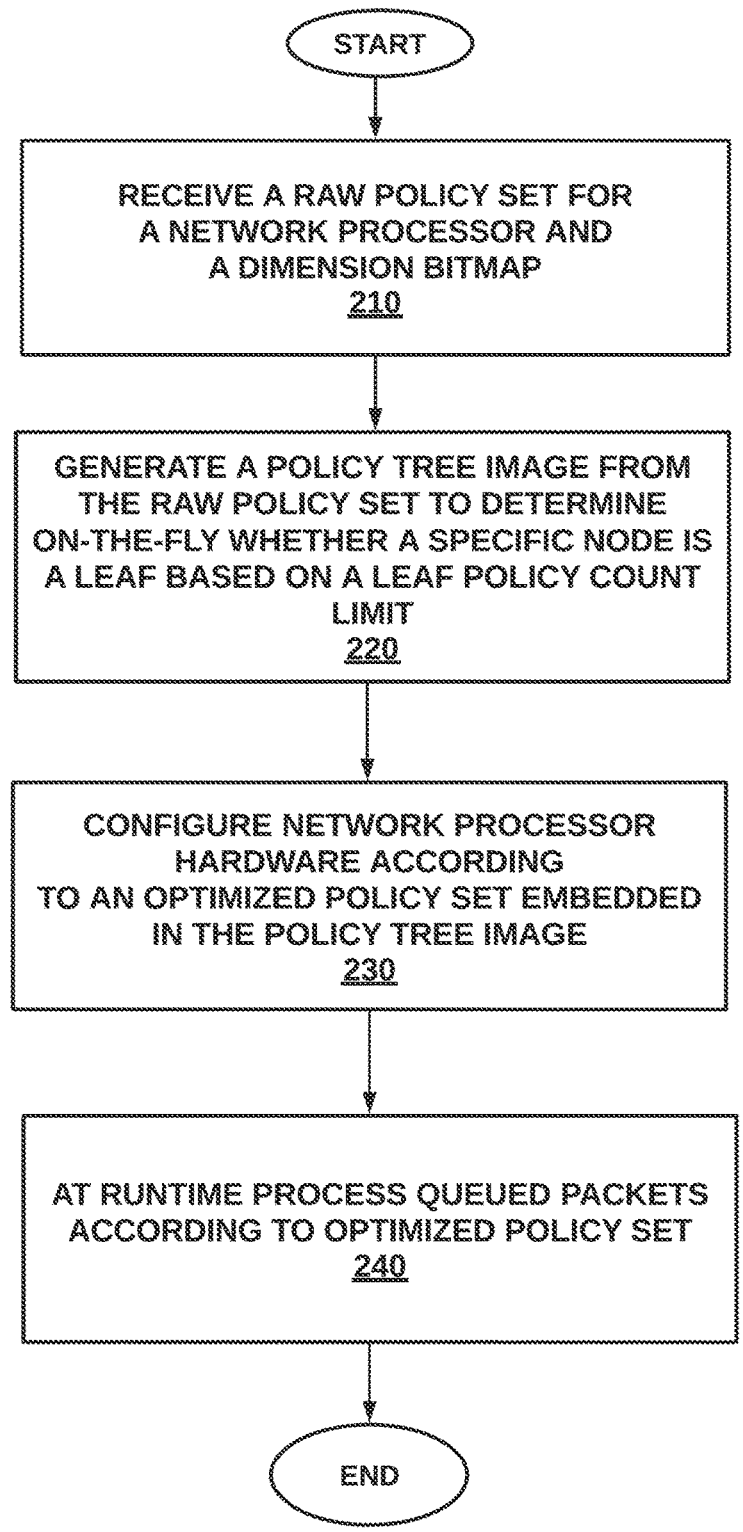
FIG. 2 is a high-level flow diagram illustrating for dynamic leaf generation determination for generic tree policy search optimization in high-speed network processor configuration for examining data packets, according to one embodiment.

FIG. 2 is a high-level flow diagram illustrating a method for dynamic leaf generation determination for generic tree policy search optimization in high-speed network processor configuration for examining data packets, according to one embodiment. The method 200 can be implemented, for example, by the network processor 100 of FIG. 1. The steps are merely representative groupings of functionality, as there can be more or fewer steps, and the steps can be performed in different orders. Many other variations of the method 200 are possible.

A policy set for the network processor and a dimension bitmap corresponding to the policy set (step 210). The policy set can be entered by a network administrator using a GUI or script, or automatically by a process. A network processor driver can translate the policy set.

A policy tree builder to generate a policy tree image from a set of recursive operations on the policy set including selecting boundaries of the policy set from cuts on a given dimension of the policy set (step 220). The dimension cut can be based on a dimension selection and a partition number selection for the policy set.

Network processor hardware configured including at least one set of registers, at least one set of tables, and at least one sequence of instructions, according to an optimized policy tree embedded in the policy tree image (step 230).

A queue receives packets of the packet session (step 240). The network processor applies the optimized policy set to the packet session from the data communication network by the network processor hardware.

Figure 3:
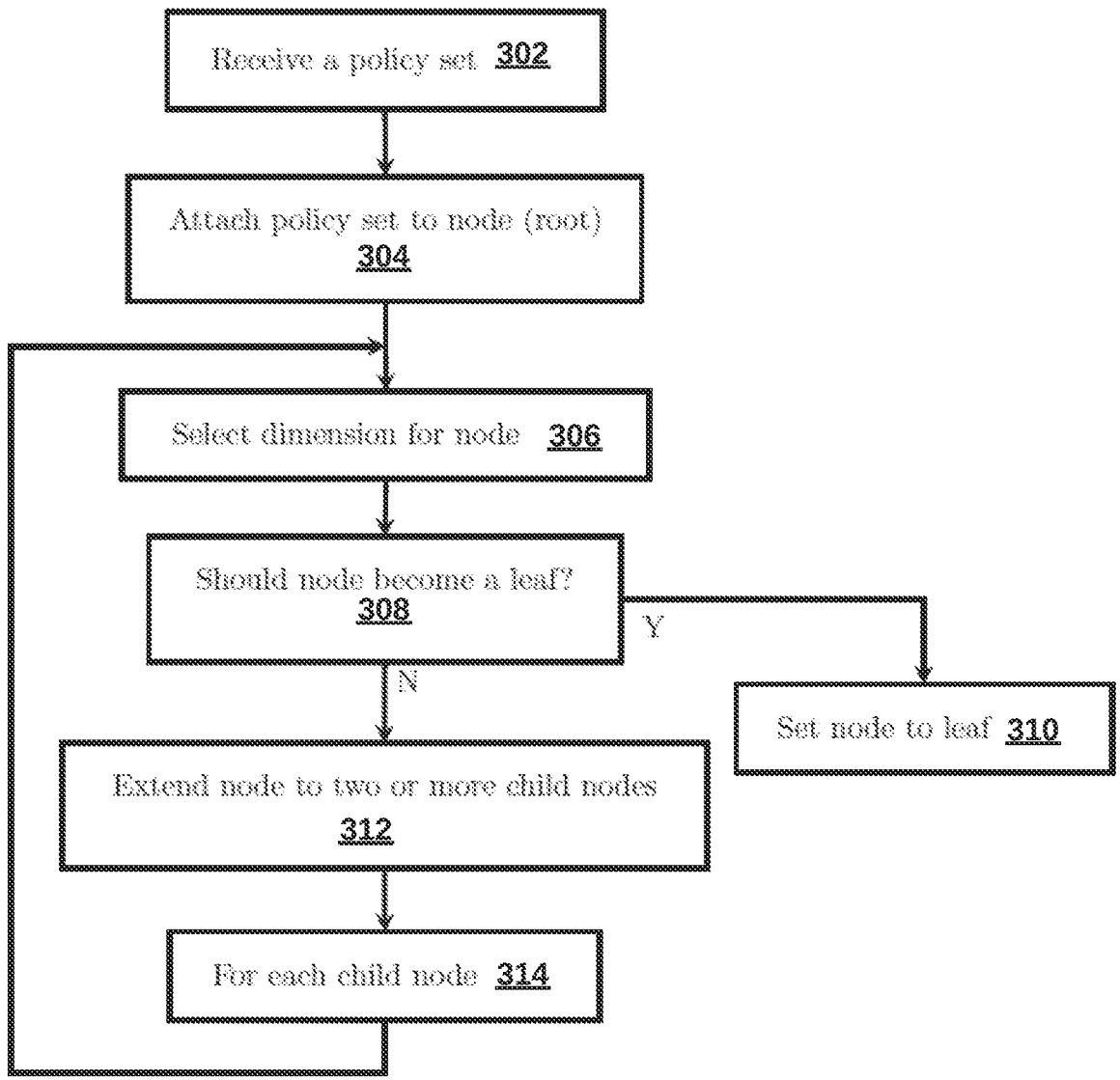
FIG. 3 is more detailed flow chart for a step of building a policy tree from a policy set, from the method of FIG. 2, according to an embodiment.

FIG. 3 is more detailed flow chart for the step 220 of building a policy tree from a policy set, from the method of FIG. 2, according to an embodiment. For a received policy set (step 302), a policy set is attached to a node (step 304) which is initially a root node. Next, a recursive loop creates child nodes (steps 306, 308, 312, 314) until the node is set to a leaf (step 310). In particular, a dimension is selected for the node (step 306), and the techniques disclosed herein determine whether the node should become a leaf (step 308). If not, two or more child nodes are created (step 312) and the recursive loop continues for each child node (step 314). Additional dimensions for a particular node can also be selected and looped (steps 308, 310, 312).

Figure 4:
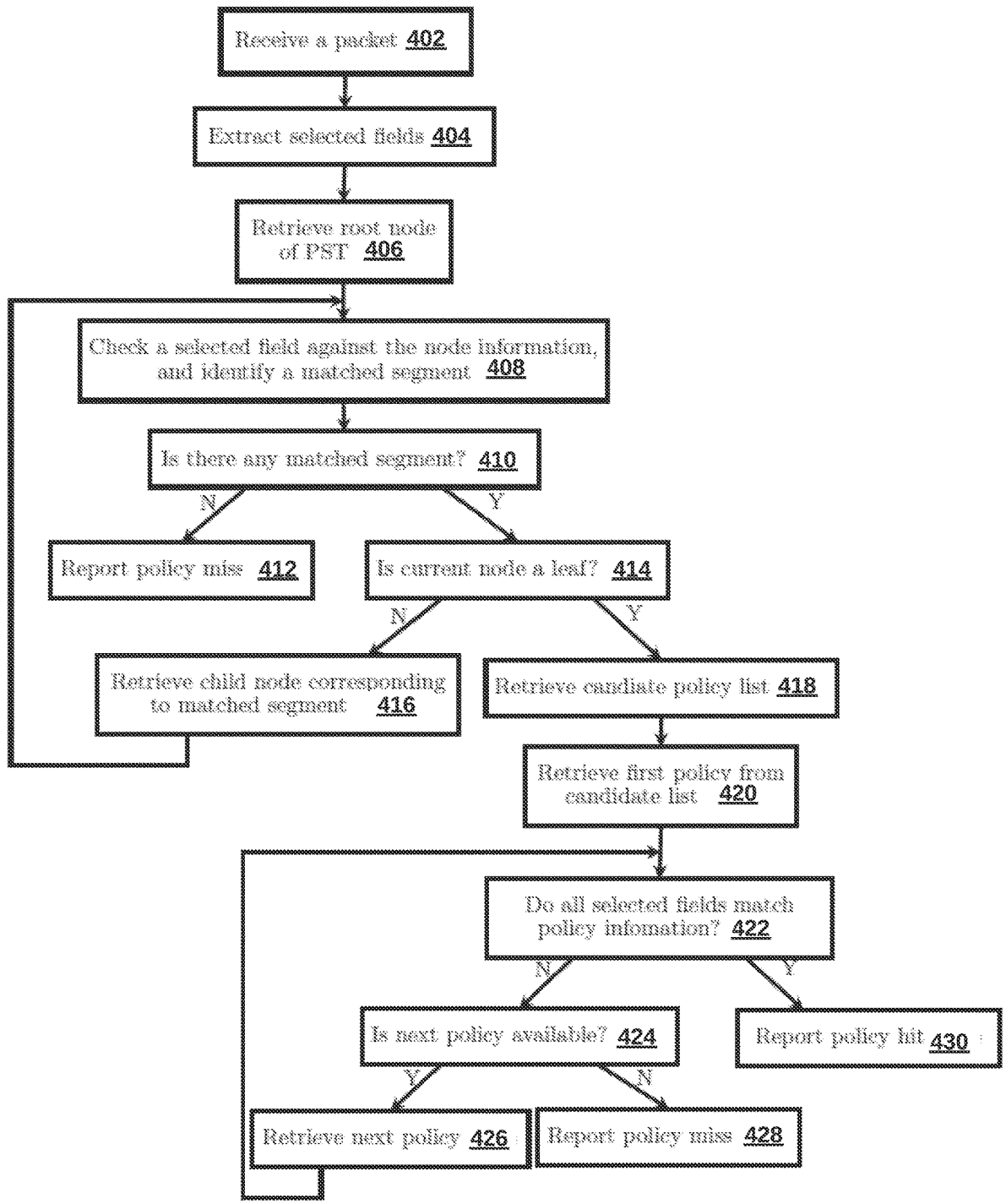
FIG. 4 is a more detailed flow chart for a step of policy search from a policy tree, from the method of FIG. 2, according to an embodiment.

A PST-based policy search process works as illustrated in FIG. 4. For an incoming packet received (step 402) by the gateway, one or more selected fields are extracted (step 404). Then the policy search engine (PSE) in the gateway loads the PST root node information, and compare it with a selected field (step 406 and 408). The root node information usually contains one or more segments. If none of the segments is a match, the PSE will report a policy miss (step 412) and the packet will be handled in certain pre-defined default manner.

If one of the segments is a match with the selected field, the PSE will check whether this node is a leaf of the PST (step 414). If it is not a leaf, a child node corresponding to the matched segment is retrieved (step 416) and the search goes back to another round of field comparison recursively (step 408).

If this node is a leaf, the candidate list belonging to this node is retrieved (step 418). Thereafter, one by one, the information of policies in the candidate list are compared with the fields until a match on all selected fields is found (step 422, 424, and 426), and this policy will be reported as a hit (step 430). In certain situation, there is no matched policy in the candidate list, and a policy miss will be reported (step 428).

Due to the vast variety of policy sets that are potentially used by network administrators to configure the gateway, a tradeoff between achieving desirable performance and maintaining acceptable memory footprint has to be taken into consideration under the following situations.

Situation 1. Policies spread out on given dimensions. In this scenario, the PST is usually more balanced among different branches. In other words, the depths between branches are similar to each other. When the number of policies grows, all branches of the PST grow deeper. To certain point the node count can be too big to fit into a limited cache/memory space that is preferred for an optimal search process. Thus, a scheme is needed to prevent the branches from growing too deep.

Situation 2. Policies are concentrated at one or more narrow ranges on given dimensions. In this scenario the branches corresponding to these ranges are likely to extend deeper than other branches. Each of these branches extends similarly as the entire PST in Situation 1 does, when the policy set grows. Therefore, the scheme that works for the entire PST has to be applicable to given branches.

Situation 3. Some policies spread out, while others are concentrated at a few narrow ranges. The branches corresponding to the narrow ranges with a higher policy density are likely to extend deeper than others. As in aforementioned Situation 1 and 2, the scheme needs to work for the deep branches. Meanwhile, other branches should not be terminated too early; otherwise, it may lead to a long candidate list of policies that have to be matched one by one linearly.

Situation 4. Multiple-range policies exist in the policy set. The PST can get complex when a few policies have many separate ranges on given dimensions. As each of these policies is likely to fall into multiple branches, which triggers the branches to extend deeper, or makes the candidate list longer, the scheme must be able to differentiate multiple-range policies from single-range policies in a way that affects the PST creation.

A. Dynamic Leaf Generation

By analyzing the aforementioned situations, one of the key components of tree creation by the network processor configuration module 140 can decide whether a node is a leaf. Once a node is flagged as a leaf, the policy set under this node forms a candidate list. From FIG. 3, the search does not go deeper once a leaf is reached. Therefore, an early leaf node leads to a shorter path from the root, which benefits the performance of the policy search process before reaching the leaf. On the other hand, when the policy set grows, all things being equal, a leaf node on a shorter path likely carries a longer candidate list, which can become the performance bottleneck of the policy search.

As different regions of a given PST may not have a uniform policy set distribution on all dimensions, a static global setting of leaf determination strategy will not adapt well. In other words, the leaf determination strategy has to be applicable to different regions based on the features of the given region, without losing efficiency.

There are two critical measurements that can be utilized by a node for leaf determination, 1) policy count, and 2) distinct range count.

For a given node, the policy count (polcnt) is the number of policies in the policy set under this node. These policies will form the candidate list if the node is determined as a leaf.

For a given node on a certain dimension, the distinct range count (rngcnt) is the number of distinct ranges of the dimension, for policies in the policy set under this node.

Figure 5A:
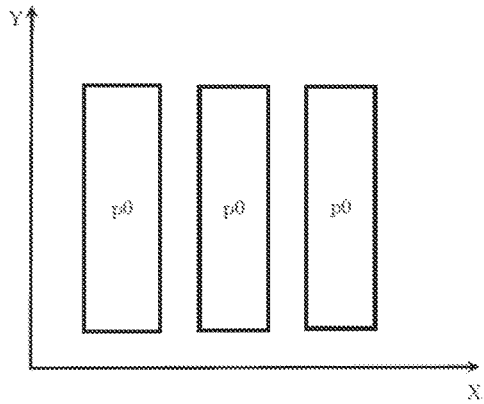
FIG. 5A is an example graph of policy count versus range count, with a policy count of 1 for a range count (x) of 3 and a range count (y) of 1, according to an embodiment.
Figure 5B:
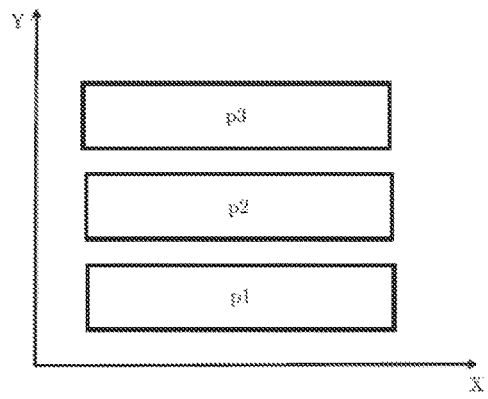
FIG. 5B is another example graph of policy count versus range count, with a policy count of 3 for a range count (x) of 1 and a range count (y) of 3, according to an embodiment.

FIGS. 5A and 5B are graphs illustrating two cases of polcnt vs rngcnt. FIG. 5A is a graph showing a single policy p0 (polcnt=1), which has three distinct ranges on dimension X (rngcnt(x)=3), but only one distinct range on dimension Y (rngcnt(y)=1). FIG. 5B shows three policies p1, p2, and p3 (polcnt=3). They have the same single range on dimension X (rngcnt(x)=1), but separate ranges on dimension Y (rngcnt(y)=3).

Once the TBR selects a dimension, rngcnt on that dimension will be combined with polcnt to decide whether the current node should become a leaf, or the branch where the node is needs to go deeper by creating child nodes for this node. There are four scenarios for the combination.

Scenario 1. When both polcnt and rngcnt on the given dimension are small, the branch should not extend and the node is likely to become a leaf.

Scenario 2. When both polcnt and rngcnt on the given dimension are large, the branch should extend deeper so the final leaf nodes will carry a shorter candidate list while each policy in the candidate list will have a more precise range on the given dimension.

Scenario 3. When polcnt is large but rngcnt on the selected dimension is small, the branch should not extend too deep as creating more child nodes can neither effectively shorten the candidate list, nor improve the range precision of policies.

Scenario 4. When polcnt is small but rngcnt is large, the branch may extend to certain point, as creating more child nodes likely makes each policy in the candidate list more precise on the range of the given dimension, even though the candidate list may not be shortened.

In order to control the length of candidate list of a leaf, as well as the depth of the branch, a dynamic leaf policy count limit is devised. Two values, MIN_LEAF_POLCNT_LMT and MAX_LEAF_POLCNT_LMT, are pre-configured for the TBR to choose a final leaf policy count limit (lcl) for each node, based on the measurements of polcnt and rngcnt on the selected dimension of this node.

Figure 5C:
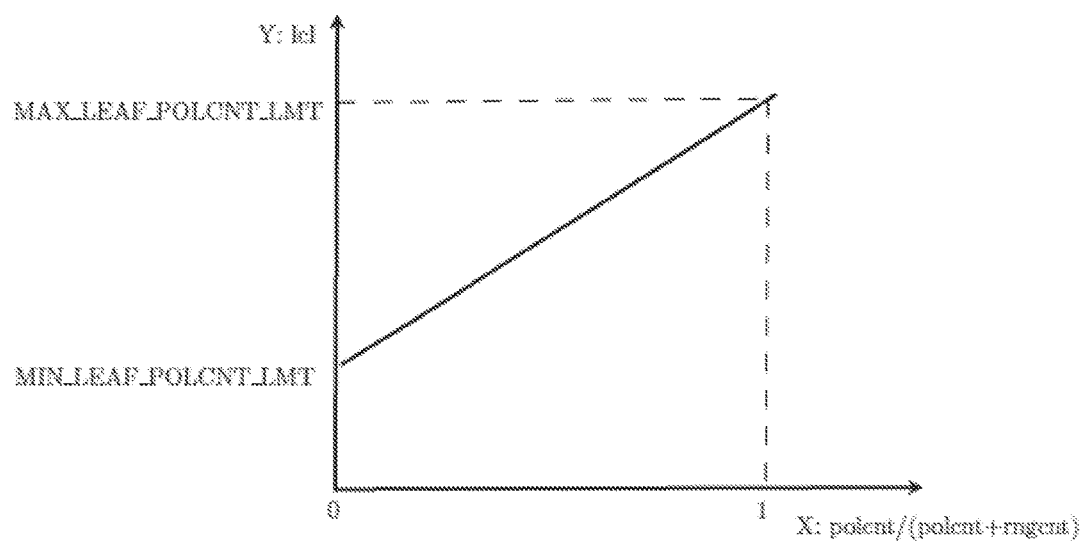
FIG. 5C is a graph illustrating the relationship between lcl and the aforementioned measurements, according to one embodiment, according to an embodiment.
Figure 5F:
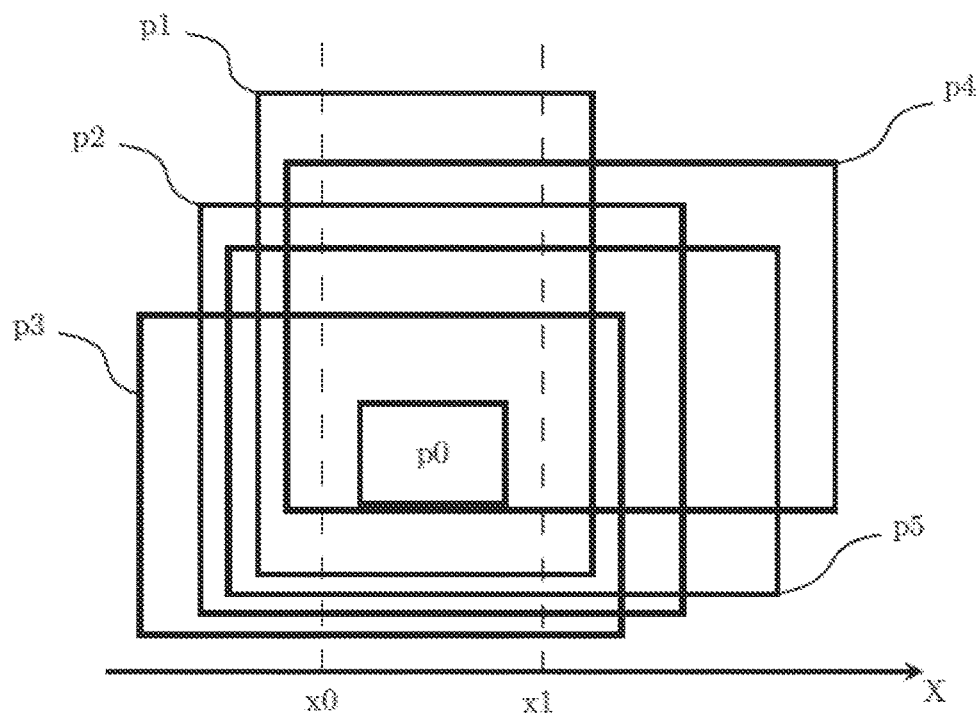
FIG. 5F is a schematic diagram illustrating a sample policy set with large policy count and small range count, according to an embodiment.

FIG. 5C is a graph illustrating the relationship between lcl and the aforementioned measurements, according to one embodiment. Let X axis represents the ratio of polcnt to polcnt+rngcnt, it is a value between 0 and 1. When polcnt is far greater than rngcnt, the X coordinate value will be close to 1; therefore, the Y coordinate value will be near MAX_LEAF_POLCNT_LMT, and the current node will be more likely to become a leaf. On the other hand, when polcnt is far smaller than rngcnt, the X coordinate value will be almost 0, and the Y coordinate value will be near MIN_LEAF_POLCNT_LMT. Thus, the current node will be more unlikely to become a leaf (and the branch will continue to extend). If each policy contributes exactly one range in rngcnt, the X coordinate value will be 0.5 and the Y coordinate value will be halfway between MIN_LEAF_POLCNT_LMT and MAX_LEAF_POLCNT_LMT.

By taking some corner cases into consideration, the pseudo code of the design regarding the dynamic leaf policy count limit is given in FIG. 5D. In order to determine the value of lcl, pseudo function get_leaf_polcnt_limit( ) is called and it returns the value based on polcnt, rngcnt, MIN_LEAF_POLCNT_LMT, and MAX_LEAF_POLCNT_LMT. After obtaining the value of lcl, pseudo function set_leaf( ) compares it with polcnt and rngcnt. It sets is_leaf flag of given node to true and returns true if polcnt is not greater than lcl; or keeps is_leaf flag of the given node cleared by setting it to false and returns false.

There is a secondary condition for leaf determination, in one embodiment. When rngcnt is compared with lcl, there is a pre-configured value, COEF_RNGCNT_LMT, which works as a coefficient that multiplies lcl to get another threshold value. This threshold value is compared against rngcnt. In one embodiment, COEF_RNGCNT_LMT is set to 4 to achieve a good result of memory footprint and performance tradeoff, given certain policy sets. It is possible to use other values for other policy sets. A larger COEF_RNGCNT_LMT value leads to a shallower tree when some policies have many ranges on a selected dimension, but policies in the candidate list may have more ranges to check on average.

Pseudo function set_leaf( ) is a key building block of the design, which is called by pseudocode in FIG. 5E. Given a root node, pseudo function build_tree_from_node( ) obtains a dimension (dim) by calling select_dim( ) which scans the pre-configured active dimension list (ACTIVE_DIM_LST). In ACTIVE_DIM_LST, each dimension (such as source IP, destination IP, protocol, source port, destination port, etc) can be represented by a non-negative integer number (0, 1, each a dimension ID.

Pseudo function select_dim( ) calls another pseudo function get_dim_metric( ) which checks a given dimension on the node, and converts the dimension feature to a measurement that helps select the best dimension. In one embodiment, get_dim_metric( ) uses rgncnt on the given dimension as the measurement directly. There can be other ways to calculate this measurement, and only get_dim_metric( ) needs to be updated if the measuring process is changed.

If in one group of settings, MIN_LEAF_POLCNT_LMT is 1, MAX_LEAF_POLCNT_LMT is 4, COEF_RNGCNT_LMT is 4. For the policy set illustrated in FIG. 5A, when dimension X is selected, lcl is 1 (integer part of 1.75), and this node is a leaf. For the policy sets illustrated in FIG. 5B, when dimension Y is selected, lcl is 2 (integer part of 2.5), and thus the node is not a leaf. If COEF_RNGCNT_LMT is 2, while other settings are unchanged, both policy sets in FIG. 5A and FIG. 5B are not sufficient for making the node a leaf.

In order for a more comprehensive analysis of the design, the aforementioned four scenarios between polcnt and rngcnt are revisited. It is clear for one skilled in the art that Scenario 1 is more likely to trigger a leaf node and Scenario 2 is more unlikely to do so, according to the design. For Scenario 3, an illustration is given in FIG. 5F, where x0 and x1 are the lower and upper boundaries, respectively, of a given node, on dimension X. Therefore, for this node, it only sees two distinct ranges, one from policy p0, and the other one from all other policies. If MIN_LEAF_POLCNT_LMT is 4, MAX_LEAF_POLCNT_LMT is 8, and COEF_RNGCNT_LMT is 2, this node is a leaf with a lcl value of 7, which matches our goal for Scenario 3.

Figure 5G:
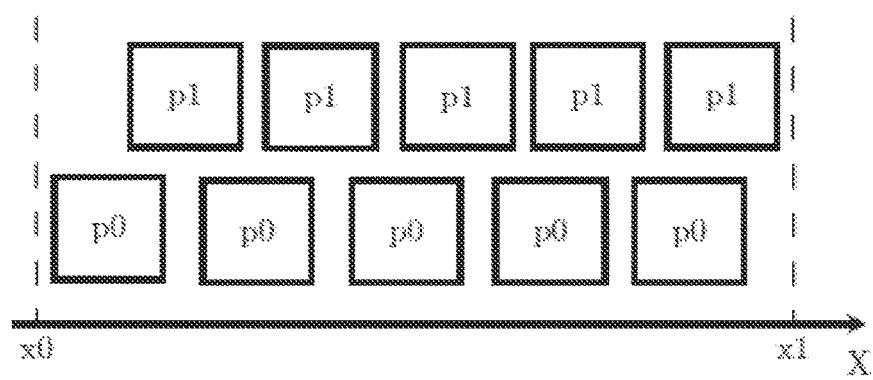
FIG. 5G is a schematic diagram illustrating a sample policy set with small policy count and large range count, according to an embodiment.

In FIG. 5G, between the lower boundary of x0 and higher boundary of x1, a node sees 10 ranges on dimension X, although there are only two policies under this node. With the same settings as FIG. 5F, this node has an lcl value of 4 (integer part of 4.7). Therefore, the branch on this node will continue to extend as rngcnt>lcl*COEF_RNGCNT_LMT.

III. Generic Computing Environment for Dynamic Leaf Generation in Policy Tree Search (FIG. 6)

Figure 6:
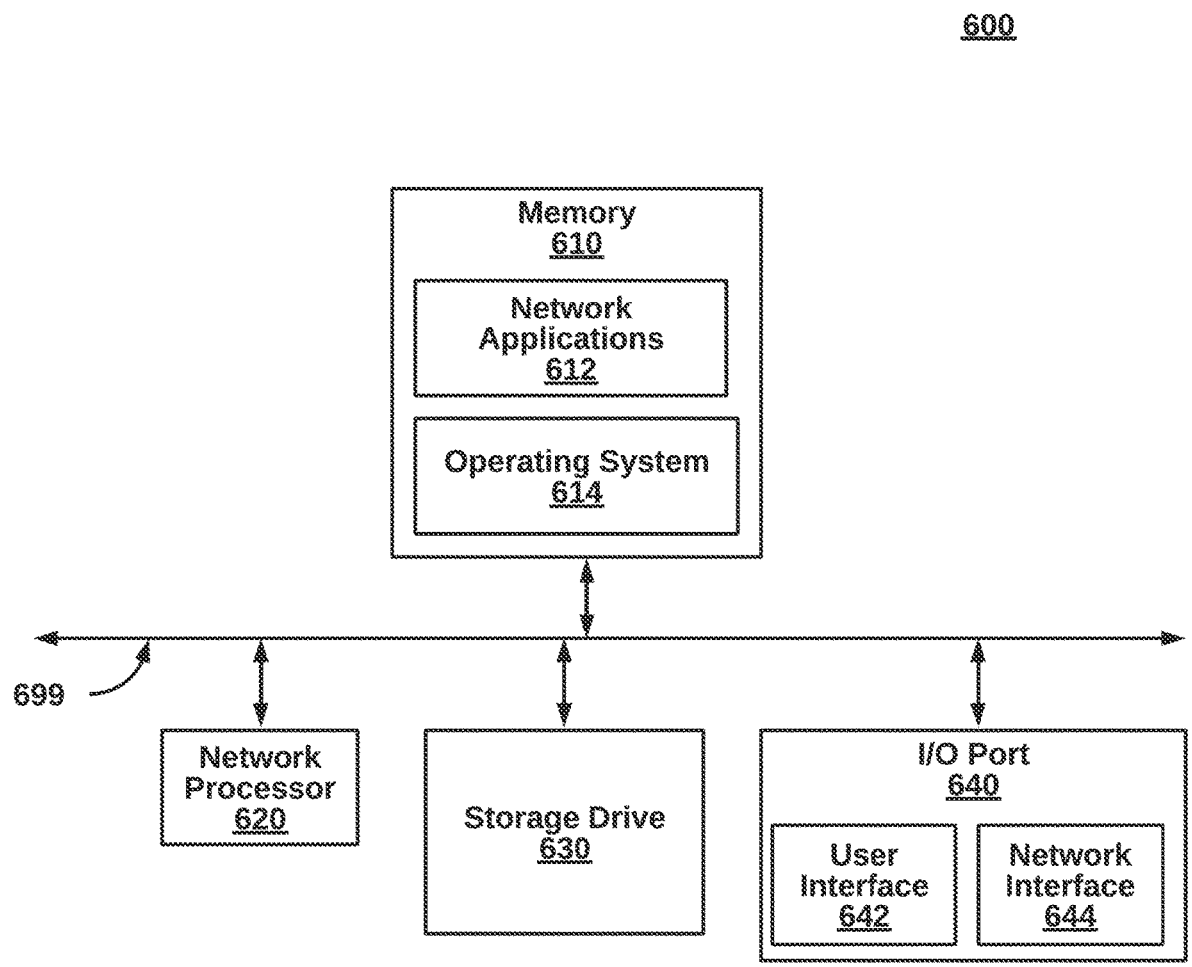
FIG. 6 is a computing device for implementing the network processor of FIG. 1, according to an embodiment.

FIG. 6 is a block diagram illustrating a computing device 600 capable of implementing components of the system, according to an embodiment. The computing device 600, of the present embodiment, includes a memory 610, a network processor 620, a storage drive 630, and an I/O port 640. Each of the components is coupled for electronic communication via a bus 699. Communication can be digital and/or analog and use any suitable protocol. The computing device 600 can be any of components of a network system (e.g., an access point, a router, a gateway, a firewall, a switch or a controller), other networking devices (e.g., an access point, a firewall device, a gateway, a router, or a wireless station), or a disconnected device.

Network applications 612 can be network browsers, daemons communicating with other network devices, network protocol software, and the like. An operating system 614 within the computing device 600 executes software, processes. Standard components of the real OS environment 614 include an API module, a process list, a hardware information module, a firmware information module, and a file system. The operating system 614 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 7-11), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The network processor 620 (e.g., optimized for IEEE 802.11, IEEE 802.11AC or IEEE 802.11AX), can be implemented by or supported by a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. FORTIASIC NP, CP, and SOC based processors (NP6, NP7, CP9, SOC4, SOC5, etc) are ASIC processors integrated with gateway functions. The network processor 620 can be single core, multiple core, or include more than one processing elements. The network processor 620 can be disposed on silicon or any other suitable material. The network processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A network processor of a network computing device on a data communication network, for dynamic leaf generation determination for generic tree policy search optimization in high-speed network processor configuration for examining data packets, the network processor comprising:
    a raw policy set for the network processor and a dimension bitmap corresponding to the raw policy set;
    a policy tree builder to generate a policy tree image from a set of recursive operations on the raw policy set including an on-the-fly determination of whether a specific node, corresponding to a selected dimension of the raw policy set, is a leaf based on a leaf policy count limit, wherein for the selected dimension, the specific node is associated with a policy count defining a number of policies from the raw policy set under the specific node and a range count defining a number of distinct ranges of the selected dimension, wherein the specific node is converted to the leaf if the policy count does not exceed the leaf policy count limit and the range count for the selected dimension does not exceed a product of the leaf policy count limit and a range count limit coefficient, and otherwise the specific node is converted to two or more child nodes, and wherein the leaf policy count limit is determined from a predetermined upper and lower limit and a ratio of the policy count and a sum of the policy count and the range count;
    network processor hardware to configure at least one set of registers, at least one set of tables, and at least one sequence of instructions according to the policy tree image; and
    a queue to receive data packets of a data packet session, wherein the network processor applies the optimized policy tree image to the data packet session from the data communication network by the network processor.

2. The network processor of claim 1, wherein the leaf policy count is related to the policy count lower limit and a product of the ratio and a difference between the policy count upper limit and the policy count lower limit.

3. The network processor of claim 1, wherein the dimension comprises at least one of a source IP, a destination IP, a protocol, a source port and a destination port.

4. The network processor of claim 1, wherein the network processor hardware comprises a policy search module.

5. The network processor of claim 1, wherein the network processor is part of an access point device.

6. The network processor of claim 1, further comprising a network processor driver to call the policy tree builder to generate the policy tree.

7. The network processor of claim 1, further comprising a network processor driver to translate the policy set for the network processor hardware.

8. A method in a network processor of a network computing device on a data communication network, for dynamic leaf generation determination for generic tree policy search optimization in high-speed network processor configuration for examining data packets, the method comprising:
- storing a raw policy set for the network processor and a dimension bitmap corresponding to the raw policy set;
- generating a policy tree image from a set of recursive operations on the raw policy set including an on-the-fly determination of whether a specific node is a leaf based on a leaf policy count limit, corresponding to a selected dimension of the raw policy set, is a leaf based on a leaf policy count limit, wherein for the selected dimension, the specific node is associated with a policy count defining a number of policies from the raw policy set under the specific node and a range count defining a number of distinct ranges of the selected dimension, wherein the specific node is converted to the leaf if the policy count does not exceed the leaf policy count limit and the range count for the selected dimension does not exceed a product of the leaf policy count limit and a range count limit coefficient, and otherwise the specific node is converted to two or more child nodes, and wherein the leaf policy count limit is determined from a predetermined upper and lower limit and a ratio of the policy count and a sum of the policy count and the range count;
- converting, for a selected dimension, the specific node to the leaf if the policy count does not exceed the leaf policy count limit and the range count for the selected dimension does not exceed a product of the leaf policy count limit and a range count limit coefficient, and otherwise converting the specific node to two or more child nodes;
- configuring at least one set of registers, at least one set of tables, and at least one sequence of instructions from the network processor hardware according to the policy tree image;
- receiving, in a queue, data packets of a data packet session; and
- applying, by the network processor, the optimized policy tree image to the data packet session from the data communication network by the network processor.

9. A non-transitory computer-readable media in a network processor of a network computing device on a data communication network, implemented at least partially in hardware for, when executed by a processor, for dynamic leaf generation determination for generic tree policy search optimization in high-speed network processor configuration for examining data packets, the method comprising the steps of:
- storing a raw policy set for the network processor and a dimension bitmap corresponding to the raw policy set;
- generating a policy tree image from a set of recursive operations on the raw policy set including an on-the-fly determination of whether a specific node is a leaf based on a leaf policy count limit, corresponding to a selected dimension of the raw policy set, is a leaf based on a leaf policy count limit, wherein for the selected dimension, the specific node is associated with a policy count defining a number of policies from the raw policy set under the specific node and a range count defining a number of distinct ranges of the selected dimension, wherein the specific node is converted to the leaf if the policy count does not exceed the leaf policy count limit and the range count for the selected dimension does not exceed a product of the leaf policy count limit and a range count limit coefficient, and otherwise the specific node is converted to two or more child nodes, and wherein the leaf policy count limit is determined from a predetermined upper and lower limit and a ratio of the policy count and a sum of the policy count and the range count;
- converting, for a selected dimension, the specific node to the leaf if the policy count does not exceed the leaf policy count limit and the range count for the selected dimension does not exceed a product of the leaf policy count limit and a range count limit coefficient, and otherwise converting the specific node to two or more child nodes;
- configuring at least one set of registers, at least one set of tables, and at least one sequence of instructions from the network processor hardware according to the policy tree image;
- receiving, in a queue, data packets of a data packet session; and
- applying, by the network processor, the optimized policy tree image to the data packet session from the data communication network by the network processor.

* * * * *